Feb. 5, 1946.  E. L. BEECHER  2,394,356
SHOCK ABSORBER
Filed Aug. 22, 1944  2 Sheets-Sheet 1
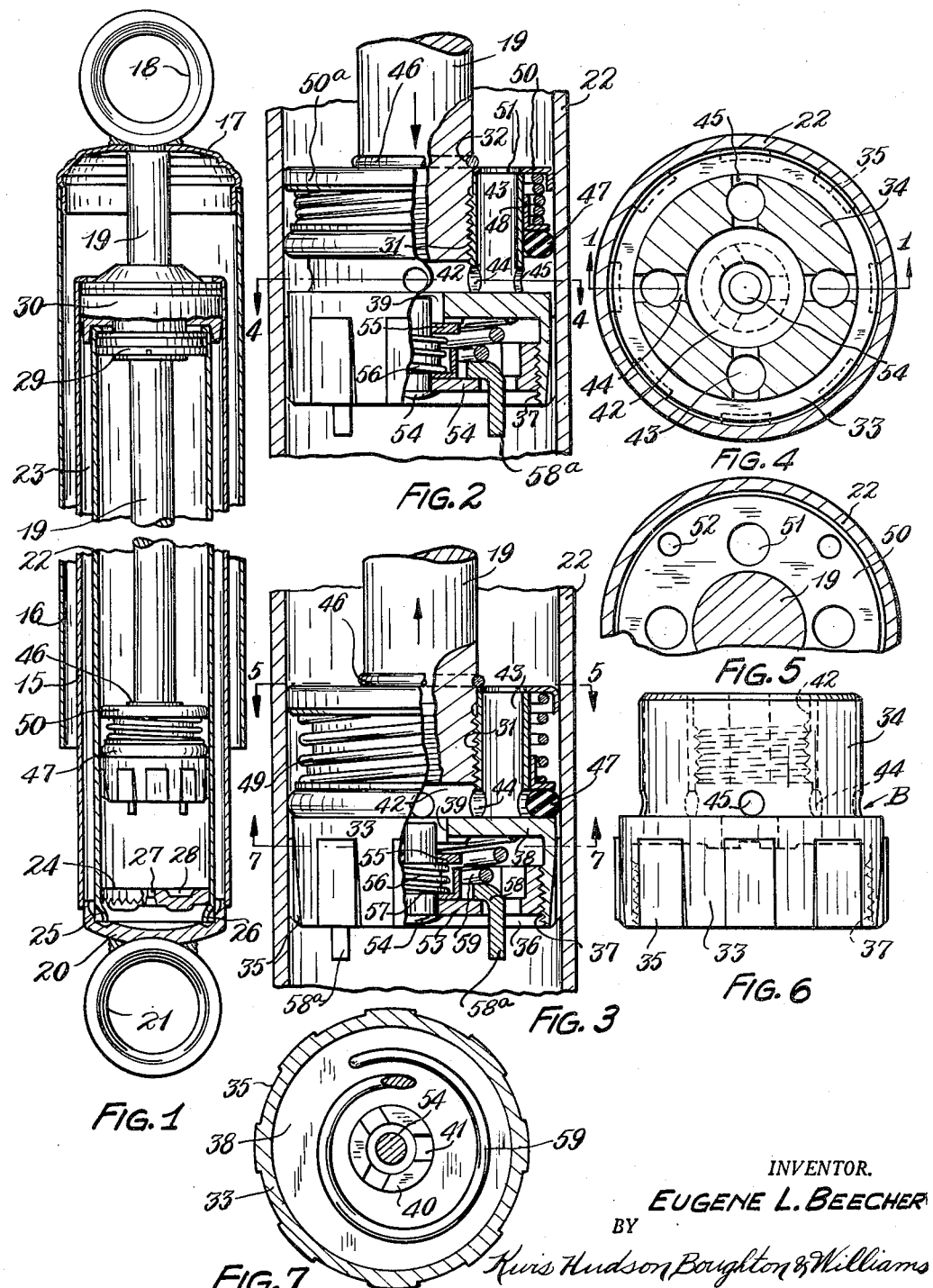
INVENTOR.
EUGENE L. BEECHER
BY
Kwis Hudson Boughton & Williams
ATTORNEYS Feb. 5, 1946.   E. L. BEECHER   2,394,356
SHOCK ABSORBER
Filed Aug. 22, 1944   2 Sheets-Sheet 2

INVENTOR.
EUGENE L. BEECHER
BY
Kwis Hudson Boughton & Williams
ATTORNEYS

Patented Feb. 5, 1946

2,394,356

UNITED STATES PATENT OFFICE 2,394,356

SHOCK ABSORBER

Eugene L. Beecher, Cleveland Heights, Ohio, assignor to The Gabriel Company, Cleveland, Ohio, a corporation of Ohio Application August 22, 1944, Serial No. 550,505

12 Claims. (Cl. 188—88)

This invention relates to a shock absorber and particularly to a fluid shock absorber. Although the invention is applicable to various types of fluid shock absorbers it is illustrated and explained herein by way of example as embodied in a direct double acting hydraulic shock absorber.

This invention in certain of its aspects is an improvement on the invention disclosed in my copending application Serial No. 490,290, filed June 10, 1943, now Patent No. 2,369,007, issued Feb. 6, 1945. In my said copending application Serial No. 490,290 the piston of the shock absorber is shown as provided with a shiftable ring which performs the dual function of a piston packing ring and a valve.

An object of the present invention is to provide in the piston of a fluid shock absorber a shiftable ring acting as a piston packing ring and also as a valve and wherein the valve action of the ring is rapid and is constant or uniform, even though the outside diameter of the ring might become worn in use.

A further object is to provide in a fluid shock absorber an improved arrangement for uniting the piston and piston rod and which arrangement obviates the necessity of providing machined shoulders and other surfaces on the rod or piston, helps to preserve the concentricity of the rod and piston and provides on the recoil stroke a metal to metal load contact between the parts as distinguished from having the piston assume the major part of the load.

Another object is to provide in the piston of a fluid shock absorber having a shiftable ring which acts as a packing ring and a valve, means for venting the space in which the ring moves to thus prevent the accumulation of fluid therein.

A further object of the invention is to improve the recoil valve carried by the piston of a fluid shock absorber so that said valve will function with a stabilized action and will not chatter during its initial opening movement.

A still further object is to provide a recoil valve such as specified in the last named object and which valve eliminates the necessity of drilling relief holes or orifices in the piston body.

Further and additional objects and advantages not hereinbefore specified will become apparent during the detailed description of embodiments of the invention which are to follow.

Referring to the accompanying drawings:

Fig. 1 is a longitudinal sectional view through a direct acting hydraulic shock absorber with certain of the parts including the piston and piston rod shown in elevation.

Figs. 2 and 3 are fragmentary sectional views through the working cylinder of the shock absorber shown in Fig. 1, with the piston shown partly in section and partly in elevation; Fig. 2 showing the relation of the parts during the impact or compression stroke of the shock absorber (the down-stroke of the piston) while Fig. 3 shows the relation of the parts during the recoil stroke of the shock absorber (the up-stroke of the piston).

Fig. 4 is a transverse sectional view through the working cylinder and piston and is taken substantially on line 4—4 of Fig. 2, looking in the direction of the arrows.

Fig. 5 is a fragmentary transverse sectional view through the working cylinder and piston rod taken substantially on line 5—5 of Fig. 3, looking in the direction of the arrows, and showing the upper end of the piston in plan.

Fig. 6 is a detached elevational view of the piston body without any valve means applied thereto.

Fig. 7 is a transverse sectional view taken substantially on line 7—7 of Fig. 3, looking in the direction of the arrows.

Fig. 8 showing the relationship of the parts during the impact or compression stroke of the shock absorber, while Fig. 9 shows the relationship of the parts during the recoil stroke thereof.

Figure 8:
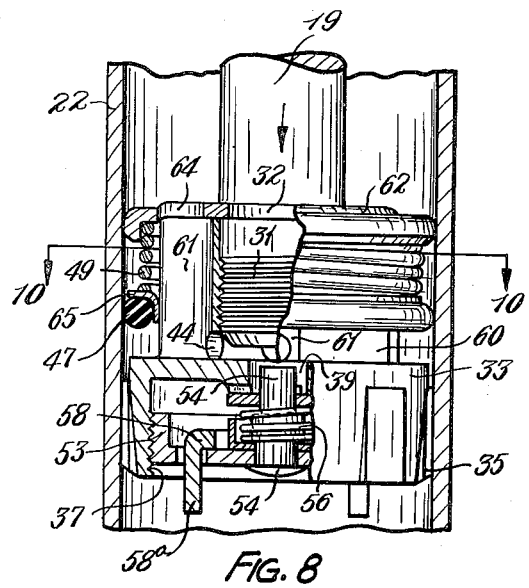
Figs. 8 and 9 are fragmentary sectional views similar to Figs. 2 and 3 but illustrating a modified form of construction.
Figure 10:
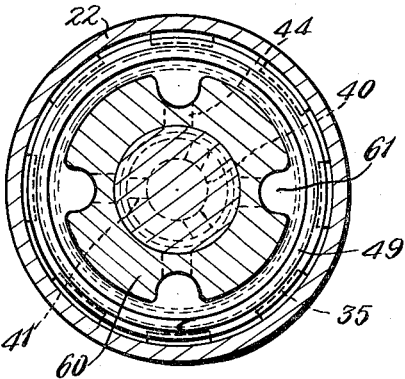
Figure 11:
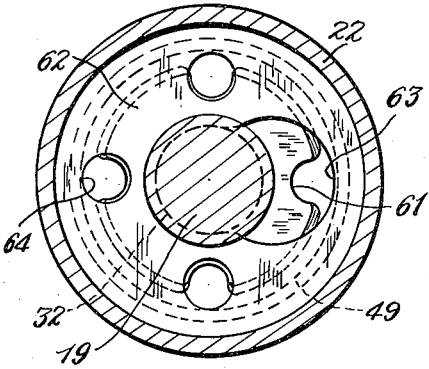
Figure 9:
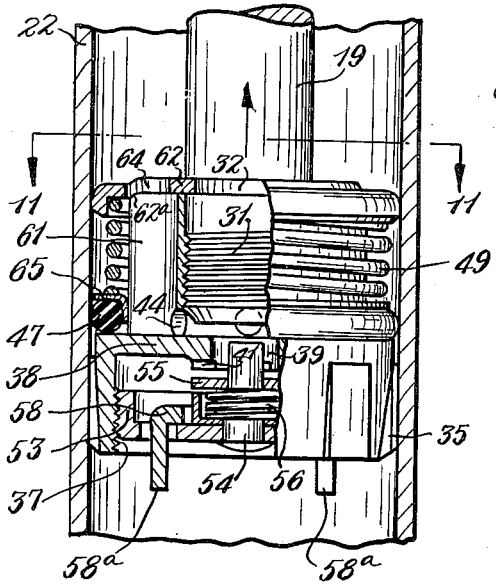
Figure 12:
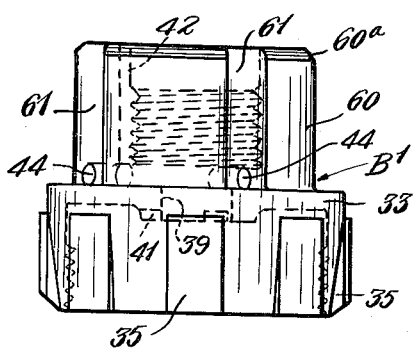

Figs. 10 and 11 are sectional views taken respectively on lines 10—10 and 11—11 of Figs. 8 and 9 looking in the direction of the arrows, and Fig. 12 is a detached elevational view of the modified form of piston body without any valve means applied thereto.

A shock absorber embodying the present invention is illustrated in the drawings and is, by way of example, a direct double acting hydraulic shock absorber. This shock absorber comprises a substantially cylindrical casing 15 which has relative telescoping movement within a cylindrical housing 16 that is spaced radially outwardly from the casing 15. The upper end of the housing 16 is closed by an inverted cup-shaped closure or cap member 17 provided on its outer side with an eye 18 with which the piston rod 19 is integral or is operatively connected thereto. The lower end of the casing 15 is closed by a cup-shaped closure member 20 which has secured to its outer side a lower eye 21. The closure members 17 and 20 extend into the housing 16 and the casing 15, respectively, and are secured thereto by welding or by other suitable means.

In mounting the shock absorber upon a motor vehicle similar mounting pins or trunnion rods (not shown) may be connected, respectively, to the frame and axle of the vehicle in any suitable manner so as to extend outwardly therefrom in parallel relationship and pass through the eyes 18 and 21. These pins or rods may be operatively connected with the eyes 18 and 21 by suitable means, well known in the art, wherefore relative movement between the frame and axle of the vehicle will cause relative telescoping movement between the casing 15 and the housing 16 and relative movement of the piston in the pressure or working cylinder as will be well understood.

The pressure or working cylinder 22 of the shock absorber is disposed within the casing 15 in spaced concentric relationship therewith, so that the space defined by the casing 15, cylinder 22, closure member 20 and a closure member for the upper end of the casing and cylinder (later to be referred to) constitutes a reservoir 23 for the oil or liquid or fluid in the shock absorber.

The lower end of the cylinder 22 extends into the cup-shaped closure member 20 and is secured thereto by suitable means understood in the art. The cylinder 22 slightly upwardly of the lower end has secured therein a closure plate 24. The cylinder 22 below the closure plate 24 is provided with an inwardly extending bead 25 which serves to retain the closure plate 24 in position while the cup-shaped closure member 20 is provided with a plurality of circumferentially spaced internal grooves or channels 26 which place the reservoir 23 in communication with the space between the closure plate 24 and the bottom of the cup-shaped closure member 20. The closure plate 24 is provided with a fixed centrally disposed orifice 27 and also has circularly spaced inwardly facing depressions 28 intermediate its circumference and the orifice 27 for a purpose later to be referred to, it being noted that in the present illustration two of these depressions are shown.

The upper or high pressure end of the cylinder 22 is closed by a plug member 29 which fits into the cylinder and is suitably secured in position therein, it being noted that the upper edge of the cylinder is turned inwardly over the outer side of the plug member. The plug member 29 is provided with a central opening through which slidably extends the piston rod 19. The construction of the plug member 29 forms no part of the present invention and therefore further description of the same is unnecessary except to say that it tightly seals the upper end of the cylinder 22. The upper end of the casing 15 is closed by a closure member 30 mounted in the casing and suitably connected thereto. The closure member 30 forms no part of the present invention and a detailed description thereof is unnecessary, except to say that said member carries a suitable spring pressed packing seal through which the piston rod 19 slidably extends.

The piston rod 19 at its inner end is externally threaded as indicated at 31, while just above the threads 31 the piston rod is provided with an annular recess or groove 32. The piston comprises a body B which may be formed in various ways but preferably the piston body is a die casting. The piston body includes a lower and larger portion 33 and an upper and reduced portion 34. The periphery of the lower portion 33 of the piston body is provided with a plurality of circularly spaced axially extending grooves or passages 35 and said grooves or passages are deeper at their lower ends than they are at their upper ends for the purpose of decreasing the resistance of the by-pass flow of fluid through the grooves during the impact or compression stroke of the piston. In the present illustration eight of the grooves 35 are shown but it should be understood that the number of these grooves or passages may be varied.

The lower portion 33 of the piston body is provided with a counterbore 36, the wall of which is threaded as indicated at 37 for a purpose later to be explained. The inner end of the counterbore 36, that is the upper end of the portion 33 of the piston body, is separated from the upper portion 34 of the body by a wall 38 in the center of which is a bore 39 communicating with the counterbore 36 and with a larger bore 42 in the upper portion 34 of the piston body. The wall 38 surrounding the bore 39 is provided with an annular impact valve seat boss 40 projecting into the counterbore 36 and provided with three radially extending grooves or notches 41 equally spaced circularly of the seat boss 40 and for a purpose later to be explained.

The upper part 34 of the piston body is provided with the previously referred to central bore 42 which is threaded so that the threaded end 31 of the piston rod 19 can be screwed into the bore 42 in uniting the piston body to the piston rod. The upper portion 34 of the piston body is also provided radially outwardly of the bore 42 with a plurality of smaller bores 43 extending from the upper end of the piston to the wall 38, there being illustrated four of these bores 43. The bores 43 are connected with the inner end of the central larger bore 42 by means of ports 44. The bores 43 are also connected with the space between the upper portion 34 of the piston body and the wall of the working cylinder 22 by ports 45. As already stated, the piston body B is connected to the piston rod 19 by screwing the threaded end 31 of the latter into the threaded bore 42 of the piston. Reference was previously made to the annular depression 32 formed in the piston rod 19 above the threaded end 31 and the purpose of said depression is to receive a split spring ring 46 which can be snapped into the depression and acts as an abutment against which the piston is screwed in assembling the parts.

Prior to mounting the piston body B on the piston rod 19, a flexible ring 47 of normal circular cross section and formed of suitable material such as synthetic rubber is mounted on the upper portion 34 of the piston body. Also slidably mounted on the upper portion 34 of the piston body is a sleeve 48 having a laterally and outwardly disposed flange arranged to engage the ring 47. A coil spring 49 is mounted on the upper portion 34 of the piston body and one of its ends engages the lateral flange of the sleeve 48. The opposite end of the spring 49 engages an inverted cup-shaped washer or abutment member 50 which is secured to the upper end of the piston body and has a central opening coaxial with the bore 42 and interfitting the piston rod 19. The washer 50 is provided with circularly spaced openings 51 aligning with the bores 43 in the piston body. The flange 50a of the washer or abutment member 50 engages the interior of the working cylinder 22 and provides a piston bearing surface. The washer 50 is also provided adjacent its circumference with a plurality of circularly spaced small openings 52 which are vent openings to prevent the accumulation of fluid in the space between the washer and the flange of the sleeve 48. It will be seen that when the piston body is assembled on the piston rod the washer 50 is in engagement with the split ring 46.

The flexible ring 47 is of such cross sectional diameter that when it is positioned around the portion 34 of the piston body it will engage the inner surface of the working cylinder 22 and act as a piston packing ring but it is capable of shifting axially of the piston under the action of the spring 49 and its frictional contact with the working cylinder when the piston moves in one direction or against the action of the spring 49 when the piston moves in the opposite direction and under the action of the fluid passing through the axial recesses or passages 35 in the lower portion 33 of the piston body and its frictional contact with the working cylinder.

A cup-shaped member 53 is screwed into the counterbore 36 in the lower portion 33 of the piston body and said member has secured rigidly and centrally thereof a stud 54 which projects upwardly into the bore 39. A flat disk recoil valve 55 is slidable on the stud 54 and said valve is held normally against the seat boss 40 by a coil spring 56 mounted on the stud 54 and contained within a small cup-shaped member 57 also mounted on the stud 54 and bearing against the bottom of the cup-shaped member 53. The construction of the valve 55 and the stud 54 is described and claimed in my Patent Reissue No. 21,908, reissued September 30, 1941.

However, it should be noted that the said boss or valve seat 40 is provided with the circularly spaced radial notches or recesses 41, wherefore there is provided passages between the disk valve 55 and its seat 40 so that a predetermined amount of fluid may flow through the bore 39 during the operation of the shock absorber even though the recoil valve 55 is seated. The provision of the notches or grooves 41 eliminates the necessity of drilling or otherwise providing a fixed orifice or orifices through the wall 38 of the piston. Furthermore, the notches or grooves 41 being spaced equally and circularly of the valve seat boss 40 provide for a stabilization of the recoil valve 55 as long as the fluid flow is confined to the notches 41 and eliminates any tendency of the valve to chatter.

A member 58 is mounted within the cup-shaped member 53 and has projections 58a extending through openings in the cup-shaped member 53. The member 58 is held against the cup-shaped member by a heavy spring 59 which spring also acts to lock the cup-shaped member in adjusted position. The projections 58a are adapted to cooperate with the recesses 28 of the closure 24 when the shock absorber is collapsed and the piston and cylinder relatively turned to effect an adjusting screwing in or out of the cup-shaped member 53 to vary the tension of the spring 56 and the action of the recoil valve 55. This last mentioned arrangement is fully explained and claimed in Christofel Patent 2,351,662, issued June 20, 1944. The operation of the shock absorber will now be explained.

In Fig. 2 the piston is shown as traveling in a downward direction in the working cylinder during the impact or compression stroke of the shock absorber. During this travel of the piston a certain volume of the fluid below the piston will pass through the fixed orifice 27 in the closure 24 and into the reservoir 23. The recoil valve 55 remains seated during the movement of the piston in the impact stroke, with a certain volume of fluid flowing through the counterbore 36 in the portion 33 of the piston body and thence through the grooves or notches 41, bore 39, the lower end of bore 42, ports 44 and bore 43 to the upper side of the piston. Also during the downward movement of the piston in the impact stroke the flexible ring 47 will be shifted axially against the action of the spring 49 a substantial distance from the position shown in Fig. 3 to the position shown in Fig. 2, due to its frictional engagement with the inner surface of the working cylinder 22 and such shifting of the ring will compress the spring 49 and will open the ports 45. Consequently fluid in substantial volume will flow during the impact stroke through the peripheral passages 35 of the portion 33 of the piston body and thence through the ports 45 and bores 43 to the upper side of the piston.

When a change in the direction of movement of the piston takes place, as when the shock absorber has completed its impact or compression stroke and starts its recoil or up stroke, the frictional contact of the ring with the inner surface of the working cylinder 22 assisted by the action of the compressed spring 49 will cause the ring 47 to quickly shift from the position shown in Fig. 2 to the position shown in Fig. 3, at which time said ring closes the ports 45 and the upper ends of the peripheral passages 35, thus preventing the flow of fluid through said peripheral passages and said ports. Consequently during the recoil stroke of the piston in the direction indicated by the arrow in Fig. 3 the fluid can only flow from the upper side of the piston to the lower side thereof through the bores 43, ports 44, the lower end of the bore 42 and the bore 39 and into the counterbore 36. Until the recoil valve 55 unseats this flow of fluid from the upper side of the piston to the lower side thereof is restricted in volume to what can flow through the notches or grooves 41 in the seat boss 40 for the recoil valve 55. However, as soon as the pressure of the fluid against the recoil valve 55 reaches a predetermined amount sufficient to overcome the action of the spring 56 the recoil valve 55 is unseated and then a larger volume of fluid will flow through the bore 39 and into the counterbore 36 and thence to the lower side of the piston. During the initial part of the recoil stroke fluid is drawn from the reservoir 23 back into the lower end of the working cylinder through the orifice 27 in the closure member 24 to prevent the formation of a vacuum beneath the piston.

It will be seen that the spring 49 effects rapid and positive shifting of the ring 47 to close the ports 45 upon the start of the recoil stroke. It will also be noted that should the ring 47 have its outside diameter worn through use it will still function properly to close the ports 45 and the peripheral passages 35 and to act as a packing ring for the piston, since it is under compression by the spring 49.

Should the recoil stroke cause the split ring 46 to engage the closure 29 this metal to metal load will be borne in large part by the split ring 46 and the piston rod as distinguished from the greater portion of such load being taken by the piston body itself.

Another advantage in the use of the split ring 46 is that it eliminates the necessity of providing a machined shoulder against which the piston body engages, thus simplifying the manufacture and assembly of the piston rod and piston body.

The construction of the piston rod and piston body is such that the concentricity of these parts is maintained readily, thus improving the action of the shock absorber and its wearing qualities.

The modified form of construction shown in Figs. 8 to 12 is believed at the present time to be the preferred form because of reasons which will later be referred to or will become apparent. Insofar as the construction shown in Figs. 8 to 12 is identical with the previously described form the same reference characters will be employed and the description of the parts thus identified need not be repeated.

In the modified form the piston body B' includes a lower and larger portion 33 which is identical with the corresponding portion of the piston body B previously described. The piston body B' also includes an upper and reduced portion 60 which differs from the upper and reduced portion 34 of the previously described piston body B in the manner now to be pointed out. The piston portion 60 is provided in its periphery with a plurality of circularly spaced axially extending recesses 61 which take the place of the passages 43 of the previously described form. The recesses 61 are substantially semi-circular in cross section and are equally spaced circumferentially of the piston portion 60, there being four of such recesses illustrated herein. The recesses 61 can be die cast or otherwise formed in the piston body thus eliminating the necessity of drilling the piston body as was required for the passages 43 in the previously described form of construction. The upper portion 60 of the piston B' is provided with a central bore 42 that communicates at its lower end with the bore 39. The bore 42 is threaded to enable the threaded end 31 of the piston rod 19 to be screwed into the piston body. The upper portion 60 of the piston body B' is provided with ports 44 that place the lower end of the bore 42 into communication with the recesses 61. In place of the snap ring 46 and the washer 50 the modified form of construction employs a cup-shaped washer 62 which is provided with an opening 63 similar to a bayonet slot, wherefore the piston rod 19 can be passed through the enlarged part of said opening 63 and then the washer 62 can be moved transversely relative to the piston rod to bring said rod into the smaller part of the bayonet slot 63 with the edge of said smaller part engaging in the annular depression or notch 32 of the piston rod. When the washer 62 is thus assembled on the piston rod 19 it will be concentric therewith.

The piston body B' when fully screwed upon the inner end of the piston rod 19 engages the lower side of the washer 62 as clearly indicated in the drawings and said washer forms an assembly abutment for the piston body and eliminates the need of using the snap ring 46 employed in the previously described form.

The large part of the bayonet slot 63 in the washer 62 overlies one of the recesses 61 and the washer 62 is provided with a plurality of openings 64 which overlie the remaining recesses 61 in the upper portion 60 of the piston body. It is not necessary in the instant form of construction to provide the washer 62 with the vent openings 52 of the previously described form, since the enlarged part of the bayonet slot 63 in the washer and the openings 64 perform the dual function of the openings 51 and 52 of the washer 50 of the previously described form.

It will be understood that when the piston body, piston rod and washer 62 are assembled and are mounted in the cylinder 22 the annular flange on the periphery of the washer will have sliding contact with the interior of the cylinder.

The flexible ring 47 which surrounds the upper portion 60 of the piston body B' has one arm of the flanged sleeve 65 interposed between it and the periphery of the body portion 60, while the other arm of said sleeve overlies the ring 47 and acts as the abutment for one end of the spring 49, the opposite end of which abuts the underside of the washer 62. It will thus be seen that the sleeve 65 acts as a carrier for the ring 47 and eliminates wear on the inner side of the ring and prevents distortion thereof into the recesses 61 when the ring is subjected to pressure. The carrier 65 also prevents the ring from rolling when it shifts axially of the piston portion 60. The ring 47 acts as a packing ring for the piston body B' and also when in the position shown in Fig. 9 during the recoil stroke of the shock absorber it functions to close the upper ends of the grooves or passages 35 in the lower portion 33 of the piston body B'.

The resistance of the spring 49 may be so proportioned that by-passing of fluid does not occur until the required amount of compression resistance is built up in the cylinder below the piston during the impact or compression stroke. Therefore it is possible to utilize the full effective diameter of the cylinder for the compression resistance up to the point at which by-passing through the grooves 35 takes place, and at such time the pressure in the cylinder created by displacement of the piston rod 19 becomes effective.

It is believed that the operation of the shock absorber construction shown in Figs. 8 to 12 inclusive will be apparent in view of the detailed explanation of the operation of the construction shown in Figs. 1 to 7 inclusive and hence need not be repeated.

It will be noted that the upper end of the portion 60 of the piston body B' is beveled as indicated at 60a and this beveled end nests within the beveled countersink 62a of the washer 62 when the parts are assembled, thus insuring concentricity of the washer with the piston body.

Although several preferred embodiments of the invention have been illustrated and described herein it will be understood that the invention is susceptible of various modifications and adaptations within the scope of the appended claims.

Having thus described my invention, I claim:

1. In a fluid shock absorber, a cylinder, a piston reciprocable therein and having a portion extending longitudinally of the cylinder but spaced radially inwardly thereof, passages extending from the opposite ends of said piston and communicating with the space between said piston portion and the cylinder and adjacent one end of said portion, a flexible packing ring mounted on said portion and having a normally circular cross section of a diameter slightly greater than the radial width of said space but substantially less than the longitudinal length of said piston portion, wherefore said ring may shift its position longitudinally of the piston upon change of direction of piston movement, and spring means carried by said piston and urging said ring toward a position wherein it seals said passages.

2. In a fluid shock absorber, a cylinder, a piston reciprocable therein and having a portion extending longitudinally of the cylinder but spaced radially inwardly thereof, passages extending from the opposite ends of said piston and communicating with the space between said piston portion and the cylinder and adjacent one end of said portion, a flexible packing ring mounted on said portion and having a normally circular cross section of a diameter slightly greater than the radial width of said space but substantially less than the longitudinal length of said piston portion, wherefore said ring may shift its position longitudinally of the piston upon change of direction of piston movement, and a coil spring mounted on said piston portion in operative association with said ring and urging the same toward a position wherein it seals said passages.

3. In a fluid shock absorber, a cylinder, a piston reciprocable therein and having a portion which has sliding contact with said cylinder and a portion of less diameter than said cylinder thus providing a space between said latter portion and said cylinder, passages extending from the opposite ends of the piston and communicating with said space adjacent one end thereof, a flexible packing ring mounted on said second named portion and having a normally circular cross section of a diameter slightly greater than the radial width of said space but substantially less than the longitudinal length of said second named piston portion, wherefore said ring may shift its position longitudinally of the piston upon change of direction of piston movement, and spring means carried by said piston and urging said ring toward a position wherein it seals said passages.

4. In a fluid shock absorber, a cylinder, a piston reciprocable therein and having a portion which has sliding contact with said cylinder and is provided in its periphery with grooves extending the complete axial length of said portion and forming with said cylinder passages extending from end to end of said portion, said piston having a second portion of less diameter than said cylinder thus providing a space between it and said cylinder, said second piston portion being located adjacent to said first named portion and being provided with passages therethrough communicating with said space adjacent to said first portion, a flexible packing ring mounted on said second named portion and having a normally circular cross section of a diameter slightly greater than the radial width of said space but substantially less than the longitudinal length of said second named portion, wherefore said ring may shift its position longitudinally of the second named portion upon change of direction of piston movement, and spring means carried by said piston and urging said ring toward a position wherein it seals all of said named passages.

5. In a fluid shock absorber, a cylinder, a piston reciprocable therein and having a portion slidable in said cylinder and a portion spaced radially inwardly from said cylinder, said first portion being provided with longitudinally extending peripheral grooves forming with said cylinder passages extending from end to end of said first portion and communicating with the space between said cylinder and said second named portion, said second named portion being provided with longitudinally extending passages communicating with said space adjacent to said first named portion, an abutment member carried by said second named portion and having sliding contact with said cylinder and provided with openings registering with the passages in said second named portion, a flexible packing ring mounted on said second named portion and having a normally circular cross section of a diameter slightly greater than the radial width of said space but substantially less than the longitudinal length of said second portion, wherefore said ring may shift its position longitudinally of said second portion upon change of direction of piston movement, and a coil spring mounted on said second portion and having one of its ends engaging said abutment member and its opposite end in operative association with said ring and acting to urge the same toward a position wherein it seals all of said named passages.

6. A fluid shock absorber as defined in claim 5 and wherein said abutment member is provided with one or more openings communicating with the space between said cylinder and said second named portion.

7. A fluid shock absorber as defined in claim 5 and wherein a flanged sleeve is slidable upon said second named portion and has its flange engaging said ring with said spring contacting said flange.

8. In a fluid shock absorber, a cylinder, a piston reciprocable therein and having a portion which has sliding contact with said cylinder, said piston having a second portion of less diameter than said cylinder thus providing a space between it and said cylinder, means providing fluid passages extending from end to end of said first portion and communicating with said space, said second portion being provided with a peripheral groove extending axially of said portion, a flexible packing ring mounted on said second portion and having a normally circular cross section of a diameter slightly greater than the radial width of said space but substantially less than the longitudinal length of said second portion, wherefore said ring may shift its position longitudinally of said second portion upon change of direction of piston movement, and spring means carried by said piston and urging said ring toward a position wherein it seals said first named means.

9. A fluid shock absorber as defined in claim 8 and wherein a flanged sleeve slides on said second named piston portion, while said ring is mounted on said sleeve and said spring abuts the flange of said sleeve.

10. A fluid shock absorber as defined in claim 8 and wherein said spring engages an abutment member, while the piston rod is provided with an annular groove adjacent said second portion of the piston, said member having a bayonet-like slot therein through which the piston rod extends with said groove interfitting the member adjacent a portion of said slot.

11. A fluid shock absorber as defined in claim 2 and wherein a flanged sleeve is slidable upon said piston portion and said ring is mounted on said sleeve and said spring abuts the flange of said sleeve.

12. A fluid shock absorber as defined in claim 2 and wherein said spring engages an abutment member while the piston rod is provided with an annular groove adjacent said piston portion, said member having a bayonet-like slot therein through which the piston rod extends with said groove interfitting the member adjacent a portion of said slot.

EUGENE L. BEECHER.